United States Patent
Subrahmanyam et al.

(10) Patent No.: US 7,027,264 B1
(45) Date of Patent: Apr. 11, 2006

(54) SLIDER WITH A SLIDER GROUND PAD ELECTRICALLY CONNECTED TO WRITE HEAD POLES AND READ HEAD SHIELDS

(75) Inventors: Jai N. Subrahmanyam, San Diego, CA (US); Gopalakrishna Kote, Fremont, CA (US); Kathy X. Tang, Fremont, CA (US); Loi D Pham, Fremont, CA (US); Jack M. Chue, Los Altos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/698,655

(22) Filed: Oct. 31, 2003

(51) Int. Cl.
*G11B 5/60* (2006.01)
(52) U.S. Cl. .................................. 360/234.5
(58) Field of Classification Search .............. 360/234.5
See application file for complete search history.

(56) References Cited

U.S. PATENT DOCUMENTS

| | | | | |
|---|---|---|---|---|
| 4,030,189 A | * | 6/1977 | Lazzari | .............. 29/603.06 |
| 5,587,857 A | * | 12/1996 | Voldman et al. | ......... 360/234.4 |
| 5,645,735 A | | 7/1997 | Bennin et al. | |
| 6,160,688 A | * | 12/2000 | Okumura | .............. 360/323 |
| 6,826,016 B1 | | 11/2004 | Katsumata | |

* cited by examiner

*Primary Examiner*—David Davis
(74) *Attorney, Agent, or Firm*—Stetina, Brunda, Garred & Brucker; Joshua C. Harrison, Esq.

(57) ABSTRACT

According to an aspect of the present invention, there is provided a slider for a disk drive. The slider includes a slider body including a slider body outer surface. The slider further includes an inductive write head including main and return poles. The slider further includes a slider ground pad disposed at the slider body outer surface. The slider ground pad is disposed in electrical communication with the main and return poles for electrically grounding the main and return poles.

26 Claims, 5 Drawing Sheets

SLIDER WITH A SLIDER GROUND PAD ELECTRICALLY CONNECTED TO WRITE HEAD POLES AND READ HEAD SHIELDS

BACKGROUND OF THE INVENTION

1. Field of the Invention

The present invention relates generally to disk drives, and in particular to a disk drive including a slider with a slider ground pad electrically connected to write head poles and read head shields.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data from and to the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly (or simply flex cable assembly). A conventional "rotary" or "swing-type" actuator assembly typically includes an actuator having an actuator body. The actuator body is configured to rotate on a pivot assembly between limited positions about an axis of rotation. A coil support extends from one side of the actuator body. A coil is supported by the coil support and is configured to interact with one or more permanent magnets to form a voice coil motor. One or more actuator arms extend from an opposite side of the actuator body.

A head gimbal assembly includes a transducer head, typically a magneto-resistive ("MR") head, which is distally attached to each of the actuator arms. To facilitate rotational movement of the actuator, the actuator assembly further includes the actuator body that has a bore and a pivot bearing cartridge engaged within the bore. Each magnetic disk includes opposing disk surfaces. Data may be recorded on a single surface or both along data annular regions. As such, the head stack assembly may be pivoted such that each transducer head is disposed adjacent the various data annular regions from adjacent the outer diameter to the inner diameter of each disk.

The head gimbal assembly includes a slider. The transducer head is disposed within the slider. A head gimbal assembly without an attached slider is referred to as a suspension assembly. In this regard the suspension assembly acts to suspend or support the slider. The head gimbal assembly may further include a trace suspension assembly, a load beam (also referred to as a "suspension"), nut plate (also referred to as a "swage plate"), and a hinge plate.

The trace suspension assembly typically includes a trace suspension assembly backing layer typically formed of a conductive material such as stainless steel. Conductive traces (formed of copper for example) are laid on a dielectric layer (such as a polyimide) formed on the trace suspension assembly backing layer. The dielectric layer electrically insulates the conductive traces from the trace suspension assembly backing layer. Such technologies are variously named TSA (Trace Suspension Assembly), NSL (No Service Loop), FOS (Flex On Suspension) and the like. These conductive traces interconnect the elements of the transducer head to the drive preamp and the circuits associated therewith. There are typically four conductive traces for the write and read differential pairs of the transducer head. The conductive traces are electrically connected to the transducer head at a trailing end of the slider. Such conductive traces are typically formed upon the dielectric layer through a deposition and/or etching process. The conductive traces include terminal pads which are disposed adjacent the slider. Various electrical connection techniques may be used to connect the terminal pads to the slider, such as gold ball bonding or wire bonding.

Trace suspension assembly backing layer includes a gimbal which overlaps with the load beam. The load beam is configured to transmit a gram load biasing force to the gimbal to "load" the slider against the disk. The hinge plate joins the load beam to the nut plate to permit the slider to follow the surface contour of the spinning disk. The spinning disk develops a laminar airflow above its surface that lifts the slider away from the disk in opposition to the gram load biasing force. The slider is said to be "flying" over the disk when in this state. The nut plate is used to attach the head gimbal assembly to a tip of the actuator arm via a swaging operation.

As disk drives have progressed to higher areal densities, the fly height has been correspondingly reduced. The reduction in fly height has made head (slider)-to-disk interactions more likely. In particular, such close proximity of the slider to the disk may result in undesirable electrical discharge between the slider and the disk. In this regard, while the slider may be attached to the gimbal using structural epoxy, a conductive material such as conductive epoxy (such as silver epoxy) may be applied for electrical and thermal conductivity. The conductive epoxy provides a conductive path to electrical ground from the slider to the gimbal which in turn is electrically connected to the load beam, the actuator arm, and eventually the disk drive base. The application of voltage between the slider and the gimbal in excess of the "breakdown voltage" may be used in order to establish an impedance path through the conductive epoxy. In practice, however, such an impedance path may not be all that well controlled and, as such, undesirable electrical discharge events between the slider and the disk may nonetheless occur. In addition, use of conductive epoxies has other problems. The thermal expansion tensor of silver conductive epoxy, for example, has significant variation with temperature due to the present of silver particles. Further, the silver conductive epoxy may cause fly height variation of the slider due to crown effects.

Accordingly, there is a need in the art for a disk drive having an improved slider design in comparison to the prior art.

SUMMARY OF THE INVENTION

According to an aspect of the present invention, there is provided a slider for a disk drive. The slider includes a slider body including a slider body outer surface. The slider further includes an inductive write head including main and return poles. The slider further includes a slider ground pad disposed at the slider body outer surface. The slider ground pad is disposed in electrical communication with the main and return poles for electrically grounding the main and return poles.

In further detail according to various embodiments, the main and return poles may be electrically connected. The slider ground pad may be electrically connected to the main pole, and the slider ground pad may be in electrical communication with the return pole through the main pole. The slider may further include a first thin film resistor layer disposed upon the main pole towards the slider body outer surface. The slider ground pad may be disposed in electrical communication with the first thin film resistor layer, and the slider ground pad may be in electrical communication with the return pole through the main pole. The slider body may include a leading side and an opposing trailing side, and the slider ground pad may be disposed at the trailing side.

The slider may further include a read head having top and bottom shields, the top shield is disposed adjacent the return pole, the slider ground pad is disposed in electrical communication with the top and bottom shields. The slider ground pad may be disposed in electrical communication with the top and bottom shields through the main and return poles. The return pole may be electrically connected to the top shield. The read head may include a second thin film resistor layer disposed between the top and bottom shields, and the top shield may be electrically connected to the bottom shield through the second thin film resistor layer. The slider ground pad may be disposed in electrical communication with the bottom shield through the top shield. The slider may further include a ground via formed in the slider body. The via may be disposed in electrical communication with the slider ground pad and the top and bottom shields, and the main and return poles may be in electrical communication with the slider ground pad through the top and bottom shields.

According to another aspect of the present invention, there is provided a disk drive. The disk drive includes a disk drive base. The disk drive further includes an actuator arm rotatably coupled to the disk drive base. The disk drive further includes a slider distally coupled to the actuator arm. The slider includes a slider body including a slider body outer surface. The slider further includes an inductive write head including main and return poles. The slider further includes a slider ground pad disposed at the slider body outer surface. The slider ground pad is disposed in electrical communication with the main and return poles for electrically grounding the main and return poles. The slider ground pad may be electrically connected to the actuator arm.

According to yet another aspect of the present invention, there is provided a slider for a disk drive. The slider includes a slider body having a slider body outer surface. The slider further includes a read head having top and bottom shields. The slider further includes a slider ground pad disposed at the slider body outer surface. The slider ground pad is disposed in electrical communication with the top and bottom shields for electrically grounding the top and bottom shields.

In further detail according to various embodiments, the top and bottom shields may be electrically connected. The slider ground pad may be electrically connected to the top shield, and the slider ground pad may be in electrical communication with the bottom shield through the top shield. The slider may further include a write head having main and return poles. The return pole may be disposed adjacent the top shield, and the slider ground pad may be disposed in electrical communication with the main and return poles. The slider may further include a first thin film resistor layer disposed upon the main pole towards the slider body outer surface. The slider ground pad may be disposed in electrical communication with the first thin film resistor layer, and the slider ground pad may be in electrical communication with the return pole through the main pole. The slider ground pad may be disposed in electrical communication with the top and bottom shields through the main and return poles. The return pole may be electrically connected to the top shield. The read head may include a second thin film resistor layer disposed between the top and bottom shields. The top shield may be electrically connected to the bottom shield through the second thin film resistor layer, and the slider ground pad may be disposed in electrical communication with the bottom shield through the top shield. The slider may further include a ground via formed in the slider body. The ground via may be disposed in electrical communication with the slider ground pad and the top and bottom shields, and the main and return poles may be in electrical communication with the slider ground pad through the top and bottom shields.

According to yet another aspect of the present invention, there is provided a disk drive. The disk drive includes a disk drive base. The disk drive further includes an actuator arm rotatably coupled to the disk drive base. The disk drive further includes a slider distally attached to the actuator arm. The slider includes a slider body including a slider body outer surface. The slider further includes a read head having top and bottom shields. The slider further includes a slider ground pad disposed at the slider body outer surface. The slider ground pad is disposed in electrical communication with the top and bottom shields for electrically grounding the top and bottom shields. The slider ground pad may be electrically connected to the actuator arm.

DESCRIPTION OF THE PREFERRED EMBODIMENTS

Referring now to the drawings wherein the showings are for purposes of illustrating preferred embodiments of the present invention only, and not for purposes of limiting the same, FIGS. 1–11 illustrate a disk drive including a slider in accordance with aspects of the present invention.

Figure 1:
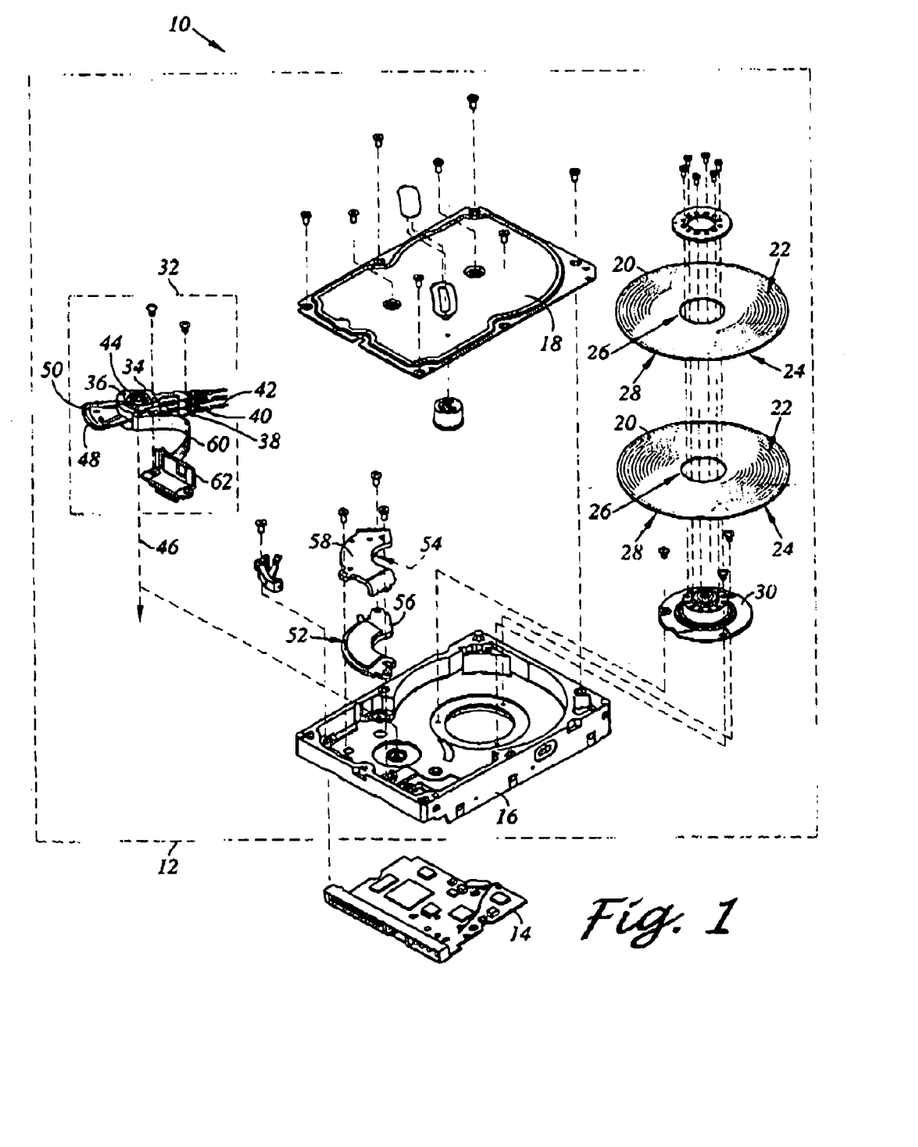
FIG. 1 is an exploded perspective view of a disk drive in accordance with an aspect of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house at least one magnetic disk 20. While two disks 20 are shown, a single disk or multiple disks may be provided. Each disk 20 contains a plurality of tracks for storing data. The tracks are disposed upon opposing first and second disk surfaces 22, 24 of the disk 20 that extend between an inner disk edge 26 (associated with the inner diameter) and an outer disk edge 28 (associated with the outer diameter) of the disk 20. The head disk assembly 12 further includes a spindle motor 30 for rotating the disk 20. The head disk assembly 12 further includes a head stack assembly 32 rotatably attached to the disk drive base 16 in operable communication with the disks 20. The head stack assembly 32 includes a rotary actuator 34.

The actuator 34 includes an actuator body 36 and actuator arms (for ease of illustration, only a lowermost one being denoted 38) that extend from the actuator body 36. Distally attached to the actuator arms (the lowermost one being denoted 38) are head gimbal assemblies (the lowermost one being denoted 40). The head gimbal assemblies 40 each includes a slider (the lowermost one being denoted 42). Each of the sliders 42 includes read and inductive write heads as further discussed in detail below. The head gimbal assemblies 40 with the sliders 42 not attached are referred to as suspension assemblies. It is contemplated that the number of actuator arms and suspension assemblies may vary depending upon the number of disks and disk surfaces utilized.

The actuator body 36 includes a bore, and the actuator 34 further includes a pivot bearing cartridge 44 engaged within the bore for facilitating the actuator body 36 to rotate between limited positions about an axis of rotation 46. The actuator 34 further includes a coil support 48 that extends from one side of the actuator body 36 opposite the actuator arms 38. The coil support 48 is configured to support a coil 50.

A pair of magnetic elements 52, 54 is supported by mounts 56, 58 which are attached to the disk drive base 16 (magnetic element 54 is indicated by the dashed lead line and it is understood the magnetic element 54 is disposed underneath the mount 58). The coil 50 interacts with the magnetic elements 52, 54 to form a voice coil motor for controllably rotating the actuator 34. The head stack assembly 32 further includes a flex cable assembly 60 and a cable connector 62. The cable connector 62 is attached to the disk drive base 16 and is disposed in electrical communication with the printed circuit board 14. The flex cable assembly 60 supplies current to the actuator coil 52 and carries signals between the transducer heads 42 and the printed circuit board assembly 14.

Figures 2, 3:
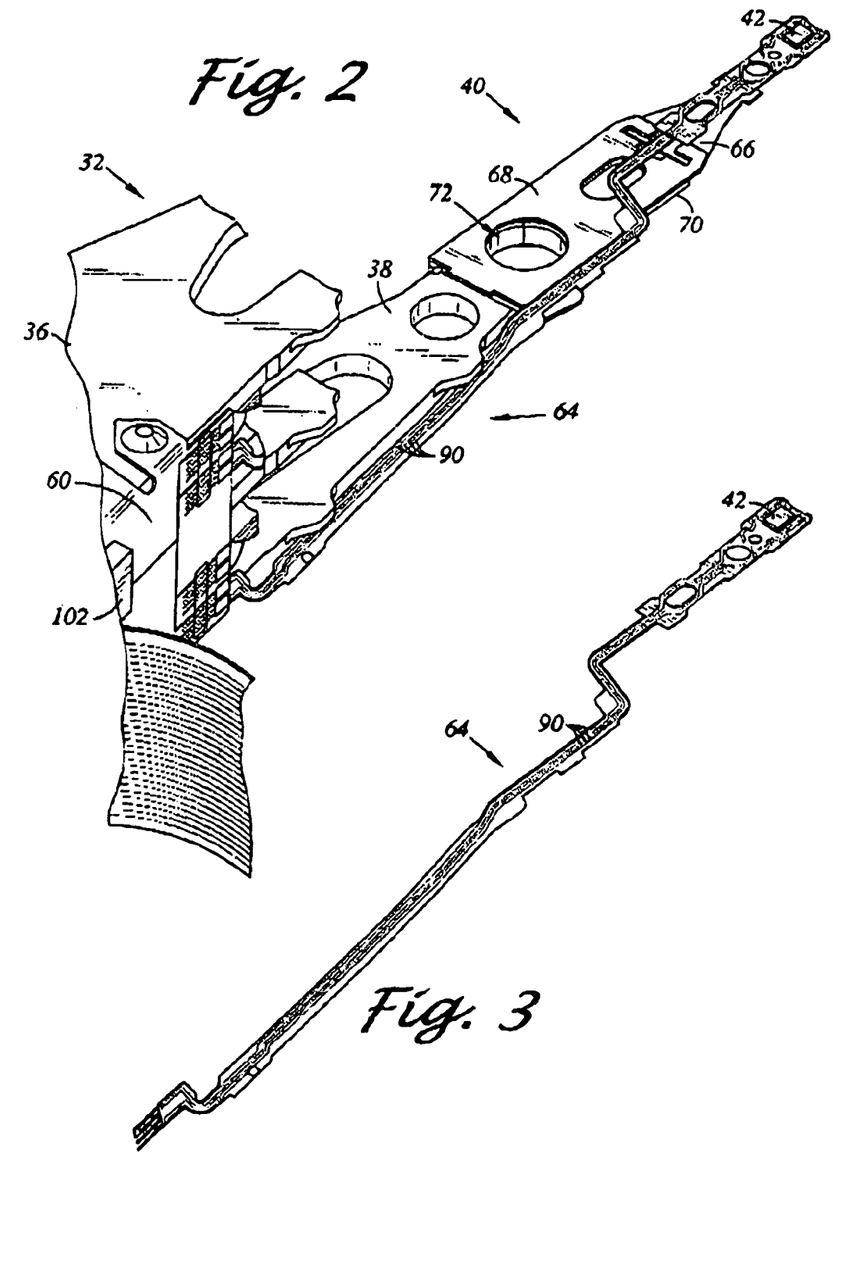
FIG. 2 is an enlarged perspective view of a portion of a head stack assembly of the disk drive of FIG. 1 including a head gimbal assembly with a slider according to an aspect of the present invention.
FIG. 3 is a perspective view of a trace suspension assembly of the head gimbal assembly of FIG. 2 as shown with a slider.
Figure 4:
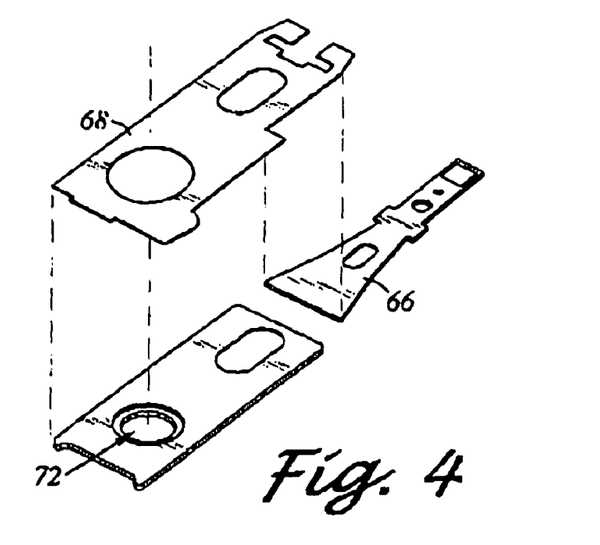
FIG. 4 is an enlarged exploded view of a load beam, a hinge plate, and a swage plate of the head gimbal assembly of FIG. 2.
Figure 5:
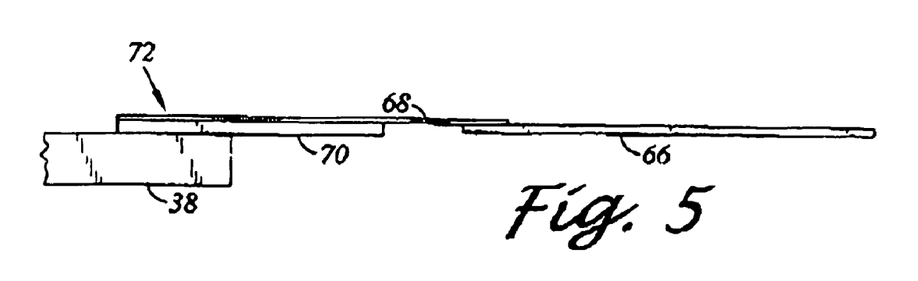
FIG. 5 is a side view of the load beam, the hinge plate, and the swage plate of FIG. 4 as assembled in relation to a portion of an actuator arm of the head stack assembly of FIG. 2.

FIG. 2 is an enlarged perspective view of a portion of a head stack assembly 32 of the disk drive 10 of FIG. 1 including the head gimbal assembly 40. Only portions of the two uppermost actuator arms 38 as shown so as to reveal the lowermost actuator arm 38. FIG. 3 is a perspective view of a trace suspension assembly 64 of the head gimbal assembly 40 of FIG. 2 as shown with the slider 42. FIG. 4 is an enlarged exploded view of a load beam 66, a hinge plate 68, and a swage plate 70 of the head gimbal assembly of FIG. 2. FIG. 5 is a side view of the load beam 66, the hinge plate 68, and the swage plate 70 of FIG. 4 as assembled in relation to a portion of an actuator arm 38. The hinge plate 68 may be used to couple the load beam 66 to the swage plate 70. The swage plate 70 may include a swage opening 72 that is utilized to attach the swage plate 70 and hinge plate 68 to the actuator arm 38 via a swaging operation. Thus, the load beam 66 may be coupled to the actuator arm 38.

Figure 6:
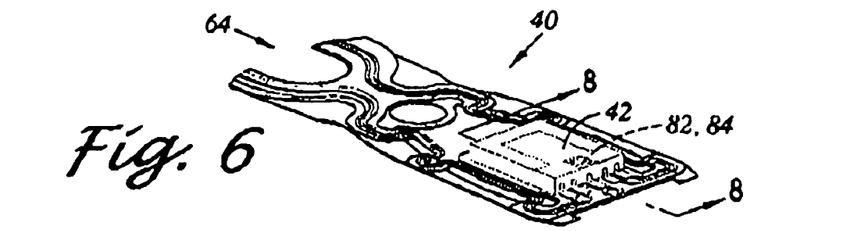
FIG. 6 is an enlarged perspective view of a portion of the trace suspension assembly and a slider (shown in phantom lines) of FIG. 3 as seen from another viewing angle.
Figure 7:
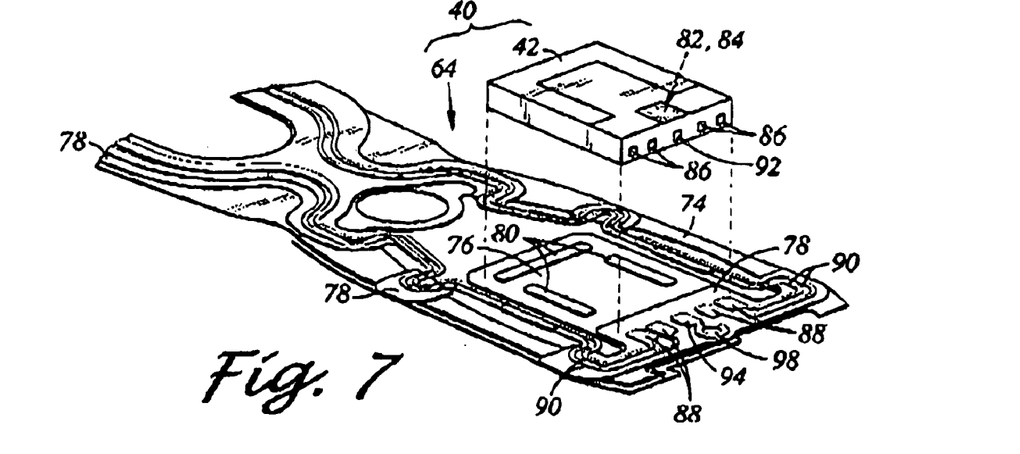
FIG. 7 is an enlarged view of the portion of the trace suspension assembly of FIG. 6 with the slider seen exploded from the trace suspension assembly.

FIG. 6 is an enlarged perspective view of a portion of the trace suspension assembly 64 and slider 42 (shown in phantom lines) of FIG. 3 as seen from another viewing angle. FIG. 7 is an enlarged view of the portion of the trace suspension assembly 64 of FIG. 6 with the slider 42 seen exploded from the trace suspension assembly 64. The trace suspension assembly 64 includes a trace suspension assembly backing layer 74 which includes a gimbal 76. The gimbal 76 is configured to support the slider 42. The trace suspension assembly 64 further includes a dielectric layer 78 disposed upon the trace suspension assembly backing layer 74. The slider 42 may be supported by dielectric layer pads 80 of the dielectric layer 78. Though not shown, in those regions about the dielectric layer pads 80, a non-conductive structural epoxy may be used for secure attachment of the slider 42 to the gimbal 76 while electrically insulating the slider 42 and the gimbal 76.

The slider 42 includes a transducer head in the form of a read head 82 and an inductive write head 84 disposed within the slider 42 (as symbolically indicated in dashed line). The slider 42 may include slider conductive pads 86 which internally connect to electrical components of the read and inductive write heads 82, 84. Trace conductive pads 88 may be formed upon the dielectric layer 78. The head stack assembly 32 may further include read and write traces 90 disposed upon the dielectric layer 78. The trace conductive pads 88 extend to the read and write traces 90. The slider conductive pads 86 may be electrically connected to the trace conductive pads 88 using any suitable electronic connection technique such as gold ball bonding. The read and write traces 90 may be disposed in electrical communication with the slider 42 and the flex cable assembly 60. The flex cable assembly 60 may include a pre-amp 102. The pre-amp 102 may be utilized to amplify electronic signals from the read and inductive write heads 82, 84 and pass such amplified electronic signals to and from the printed circuit board assembly 14.

The slider 42 may include a slider ground pad 92 for grounding the slider 42. In this regard, the slider ground pad 92 is contemplated to be electrically connected to an electrical ground source which may be chosen from any of those well know to one of ordinary skill in the art. As shown in the depicted embodiment, there is provided a trace ground pad 94 that is disposed upon the dielectric layer 78. The slider ground pad 92 may be electrically connected to the trace ground pad 94 using any suitable electronic connection technique such as with a gold ball bond 96.

The trace conductive pads 88, the read and write traces 90, and the trace ground pad 94 may be of any suitable conductive material such as a metal like copper for example. The material may be deposited and/or etched upon the dielectric layer 78. The dielectric layer 78 may be formed of a non-conductive material such as polyimide. The dielectric layer 78 is disposed between the trace suspension assembly backing layer 74 and the trace conductive pads 88, the read and write traces 90, and the trace ground pad 94. As such, the dielectric layer 78 is used to electrically insulate the trace conductive pads 88, the read and write traces 90, and the trace ground pad 94 from the trace suspension assembly backing layer 74 which may be formed of stainless steel for example.

The trace ground pad 94 may extend to a trace opening 98. The trace opening 98 may be positioned without any of the dielectric layer 78 being disposed between the trace opening 98 and the trace suspension assembly backing layer 74 as such location. In this regard, a via 100 may be disposed through the trace opening 98 for electrically connecting the trace ground pad 94 to the trace suspension assembly backing layer 74.

Figure 8:
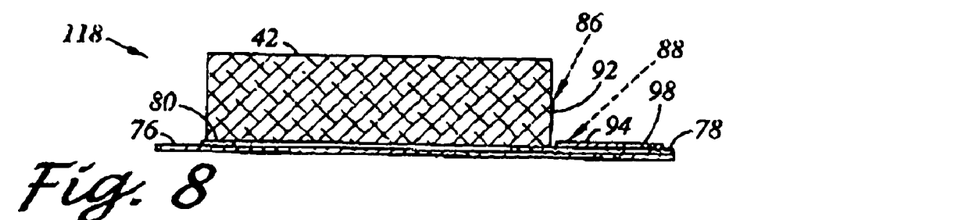
FIG. 8 is an enlarged cross-sectional side view of a portion of the trace suspension assembly and the slider as seen along axis 8—8 of FIG. 6.
Figure 9:
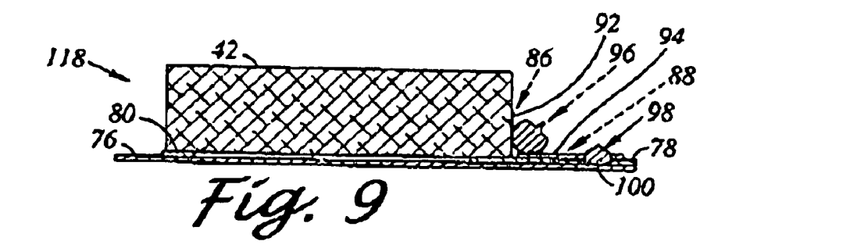
FIG. 9 is the enlarged cross-sectional side view of FIG. 8, however, as shown with electrical connections.

The trace suspension assembly backing layer 74 may be coupled to the load beam 66. The load beam 74 is generally configured to support the trace suspension backing layer 74 adjacent the gimbal 76. In this regard, the trace suspension assembly backing layer 74 may be laid upon the load beam 66. In addition, the trace suspension assembly backing layer 74 may be laid upon the hinge plate 68 and further supported by the actuator arm 38. The actuator arm 38 is coupled to the disk drive base 16 which is considered an electrical ground source. As such, in the depicted embodiment, the trace suspension assembly backing layer 74 is electrically connected to the actuator 38 thereby grounding the trace suspension assembly backing layer 74 as well. As mentioned above, the slider ground pad 92 may be electrically connected to the trace suspension assembly backing layer 74 through the via 100 for grounding the slider 42.

Figure 10:
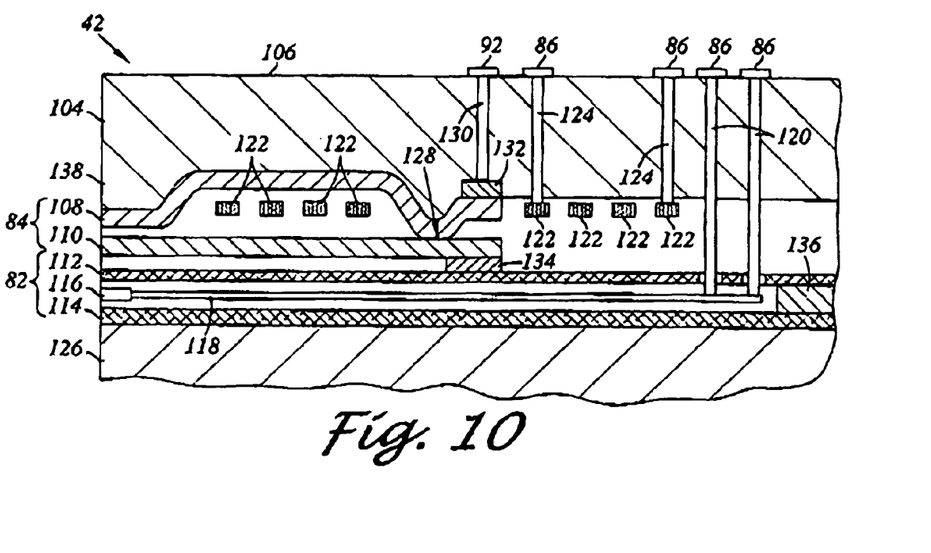
FIG. 10 is a symbolic cross-sectional side view of a portion of the slider of the disk drive of FIG. 1 including read and inductive write heads.

Referring additionally now to FIG. 10 is a symbolic cross-sectional side view of a portion of the slider 42 of the disk drive 10 of FIG. 1 including the read and inductive write heads 82, 84. This view is considered symbolic in nature in that as mentioned above the slider 42 may include the slider conductive pads 86 and the slider ground pad 92. However, in a cross-sectional side view of the slider 42, the slider conductive pads 86 and the slider ground pad 92 would be expected to be aligned all aligned with each other. As such, this figure has misaligned and separated the slider conductive pads 86 and the slider ground pad 92 so as to better facilitate the various electrical connections internal to the slider 42 as discussed below.

According to an aspect of the present invention, there is provided the slider 42 for the disk drive 10. The slider 42 includes a slider body 104 including a slider body outer surface 106. The slider 42 further includes the inductive write head 84 including main and return poles 108, 110. The slider 42 further includes the slider ground pad 92 disposed at the slider body outer surface 106. The slider ground pad 92 is disposed in electrical communication with the main and return poles 108, 110 for electrically grounding the main and return poles 108, 110.

According to various embodiments, the inductive write head 84 includes a coil 122. The coil 122 is configured to write data to the disk 20. The main and return poles 108, 110 are configured to facilitate such writing process. The coil 122 may be electrically connected to the remaining two of the slider conductive pads 86 through vias 124. With respect to such writing capabilities of the inductive write head 84, the main and return poles 108, 110 and the coil 122 are constructed in accordance with any of those methods well known to one of ordinary skill in the art. However, the inductive write head 84 according to an aspect of the present invention has the distinct advantage in respect to the prior art of being electrically grounded to the slider ground pad 92.

The main and return poles 108, 110 may be electrically connected. In the embodiment shown, the main and return poles 108, 110 are formed to contact each other at a contact location 128. The slider ground pad 92 may be directly electrically connected to the main pole 108 and the slider ground pad 92 may be in electrical communication with the return pole 110 through the main pole 108. In this regard, the slider ground pad 92 may be electrically connected to the main pole 108 through a ground via 130. A first thin film resistor layer 132 disposed upon the main pole 108 towards the slider body outer surface 106. The slider ground pad 92 is disposed in electrical communication with the main pole 108 through the ground via 108 and the first thin film resistor layer 132.

According to another aspect of the present invention, there is provided the slider 42 for the disk drive 10. The slider 42 includes the slider body 104 having a slider body outer surface 106. The slider 42 further includes the read head 82 having top and bottom shields 112, 114. The slider 42 further includes the slider ground pad 92 disposed at the slider body outer surface 106. The slider ground pad 92 is disposed in electrical communication with the top and bottom shields 112, 114 for electrically grounding the top and bottom shields 112, 114.

According to various embodiments, the read head 82 includes a MR element 116. The MR element 116 is configured to detect magnetic variances upon the disk 20 for reading data from the disk 20. The top and bottom shields 112, 114 are configured for shielding the MR element 116. The MR element 116 may be electrically connected to a conductive layer 118. The conductive layer 118 may be electrically connected to two of the slider conductive pads 86 through vias 120. With respect to such reading capabilities of the read head 82, the MR element 116 and the top and bottom shields 112, 114 are constructed in accordance with any of those methods well known to one of ordinary skill in the art. However, the read head 82 according to an aspect of the present invention has the distinct advantage in respect to the prior art of being electrically grounded to the slider ground pad 92.

In further detail, the return pole 110 may be electrically connected to the top shield 112. This may be through a connector layer 134. Further, the top and bottom shields 112, 114 may be electrically connected such as through a second thin film resistor layer 136. In this regard, the slider ground pad 92 may be electrically connected to the top and bottom shields 112, 114 through the main and return poles 108, 110.

The slider body 104 may include a substrate 126. As shown, the bottom and top shields 114, 112 may be formed upon the substrate 126. The return and main poles 110, 108 may be firmed upon the top shield 114. An overcoat layer 138 may be formed upon the main pole 108. Though not specifically discussed, it is understood that additional layers such as insulation layers are integrated between the overcoat layer 138, the main pole 108, the return pole 110, the top shield 112, the bottom shield 114 and the substrate 126 choose from those which are well known to one of ordinary skill it the art.

Figure 11:
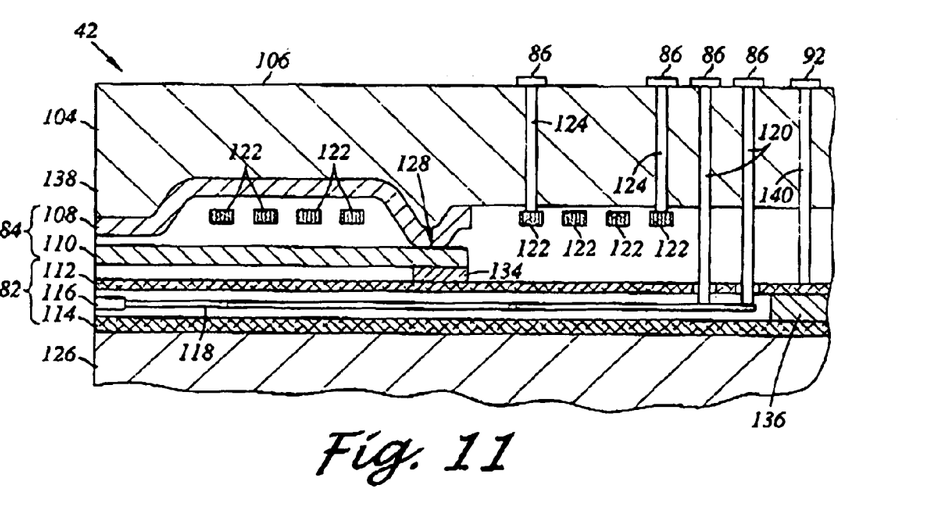
FIG. 11 is a symbolic cross-sectional side view of a portion of a slider similar to that shown in FIG. 10, however, according to another embodiment.

Referring now to FIG. 11, there is depicted another embodiment of the present invention. FIG. 11 is a symbolic cross-sectional side view of the slider 42 similar to the view of FIG. 10, however, with the differences noted. In this embodiment, there is provided a ground via 140 which electrically connects the top and bottom shields 112, 114 to the slider ground pad 92. As shown, the ground via 140 is electrically connected to the top shield 112. The slider ground pad 92 is electrically connected to the bottom shield 114 through the top shield 112. Further, the slider ground pad 92 is electrically connected to the main and return poles 108, 110 through the top shield 112.

Finally, according to another aspect of the present invention, there is provided the disk drive 10 that may includes any of the above-described configurations of the slider 42.

We claim:

1. A slider for a disk drive, the slider comprising:
   a slider body including a slider body outer surface;
   an inductive write head including main and return poles, the slider body outer surface being approximately parallel to the return pole;
   a slider ground pad disposed at the slider body outer surface;
   an overcoat layer disposed between the main pole and the slider body outer surface; and an electrical path between the inductive write head and the slider ground pad through the overcoat layer.

2. The slider of claim 1 wherein the main and return poles are directly electrically connected.

3. The slider of claim 1 wherein the slider ground pad is electrically connected to the main pole, the electrical path being disposed between the slider ground pad and the return pole through the main pole.

4. The slider of claim 1 further comprising a first thin film resistor layer disposed upon the main pole towards the slider body outer surface, the slider ground pad being disposed in electrical communication with the first thin film resistor layer, the electrical path being disposed between the slider ground pad and the return pole through the main pole.

5. The slider of claim 1 further comprising a read head having top and bottom shields, the top shield being disposed adjacent the return pole, the electrical path being disposed between the slider ground pad and the top and bottom shields.

6. The slider of claim 5 wherein the electrical path is disposed between the slider ground pad and the top and bottom shields through the main and return poles.

7. The slider of claim 6 wherein the return pole is directly electrically connected to the top shield.

8. The slider of claim 5 wherein the read head includes a second thin film resistor layer disposed between the top and bottom shields, the electrical path being disposed between the top shield and the bottom shield through the second thin film resistor layer, the electrical path being disposed between the slider ground pad and the bottom shield through the top shield.

9. The slider of claim 5 wherein the electrical path comprises a ground via formed in the slider body, the ground via being disposed in electrical communication with the slider ground pad and the top and bottom shields, the main and return poles being in electrical communication with the slider ground pad through the top and bottom shields.

10. A disk drive comprising:
a disk drive base;
an actuator arm rotatably coupled to the disk drive base; and
a slider distally coupled to the actuator arm, the slider including:
a slider body including a slider body outer surface;
an inductive write head including main and return poles, the slider body outer surface being approximately parallel to the return pole;
a slider ground pad disposed at the slider body outer surface;
an overcoat layer disposed between the main pole and the slider body outer surface; and
an electrical path between the inductive write head and the slider ground pad through the overcoat layer.

11. Disk drive of claim 10 wherein the slider ground pad is electrically connected to the actuator arm.

12. A slider for a disk drive, the slider comprising:
a slider body having a slider body outer surface;
a read head having top and bottom shields, the slider body outer surface being approximately parallel to the top shield; and
a slider ground pad disposed at the slider body outer surface;
an overcoat layer disposed between the top shield and the slider body outer surface; and
an electrical path between the read head and the slider ground pad through the overcoat layer.

13. The slider of claim 12 wherein the top and bottom shields are directly electrically connected.

14. The slider of claim 12 wherein the slider ground pad is electrically connected to the top shield, the electrical path being disposed between the slider ground pad and the bottom shield through the top shield.

15. The slider of claim 12 further comprising an inductive write head having main and return poles, the return pole being disposed adjacent the top shield, the electrical path being disposed between the slider ground pad and the main and return poles.

16. The slider of claim 15 further comprising a first thin film resistor layer disposed upon the main pole towards the slider body outer surface, the slider ground pad being disposed in electrical communication with the first thin film resistor layer, the electrical path being disposed between the slider ground pad and the return pole through the main pole.

17. The slider of claim 15 wherein the electrical path is disposed between the slider ground pad and the top and bottom shields through the main and return poles.

18. The slider of claim 15 wherein the return pole is directly electrically connected to the top shield.

19. The slider of claim 15 wherein the read head includes a second thin film resistor layer disposed between the top and bottom shields, the electrical path being disposed between the top shield being the bottom shield through the second thin film resistor layer, the electrical path is disposed between the slider ground pad and the bottom shield through the top shield.

20. The slider of claim 15 wherein the electrical path comprises a ground via formed in the slider body, the ground via being disposed in electrical communication with the slider ground pad and the top and bottom shields, the main and return poles being in electrical communication with the slider ground pad through the top and bottom shields.

21. The disk drive of claim 12 further comprises a trace suspension assembly including a ground trace, the slider ground pad is electrically connected to the ground trace.

22. The disk drive of claim 21 wherein the slider ground pad is electrically connected to the ground trace with a ball bond.

23. A disk drive comprising:
a disk drive base;
an actuator arm rotatably coupled to the disk drive base; and
a slider distally attached to the actuator arm, the slider including:
a slider body including a slider body outer surface;
a read head having top and bottom shields, the slider body outer surface being approximately parallel to the top shield;
a slider ground pad disposed at the slider body outer surface;
an overcoat layer disposed between the top shield and the slider body outer surface; and
an electrical path between the read head and the slider ground pad through the overcoat layer.

24. The disk drive of claim 23 wherein the slider ground pad is electrically connected to the actuator arm.

25. The disk drive of claim 23 further comprises a trace suspension assembly including a ground trace, the slider ground pad is electrically connected to the ground trace.

26. The disk drive of claim 25 wherein the slider ground pad is electrically connected to the ground trace with a ball bond.

* * * * *